Jan. 12, 1932. F. E. MARTIN 1,840,846
DOGGING DEVICE FOR SAWMILL CARRIAGES
Filed Oct. 1, 1926 3 Sheets-Sheet 1
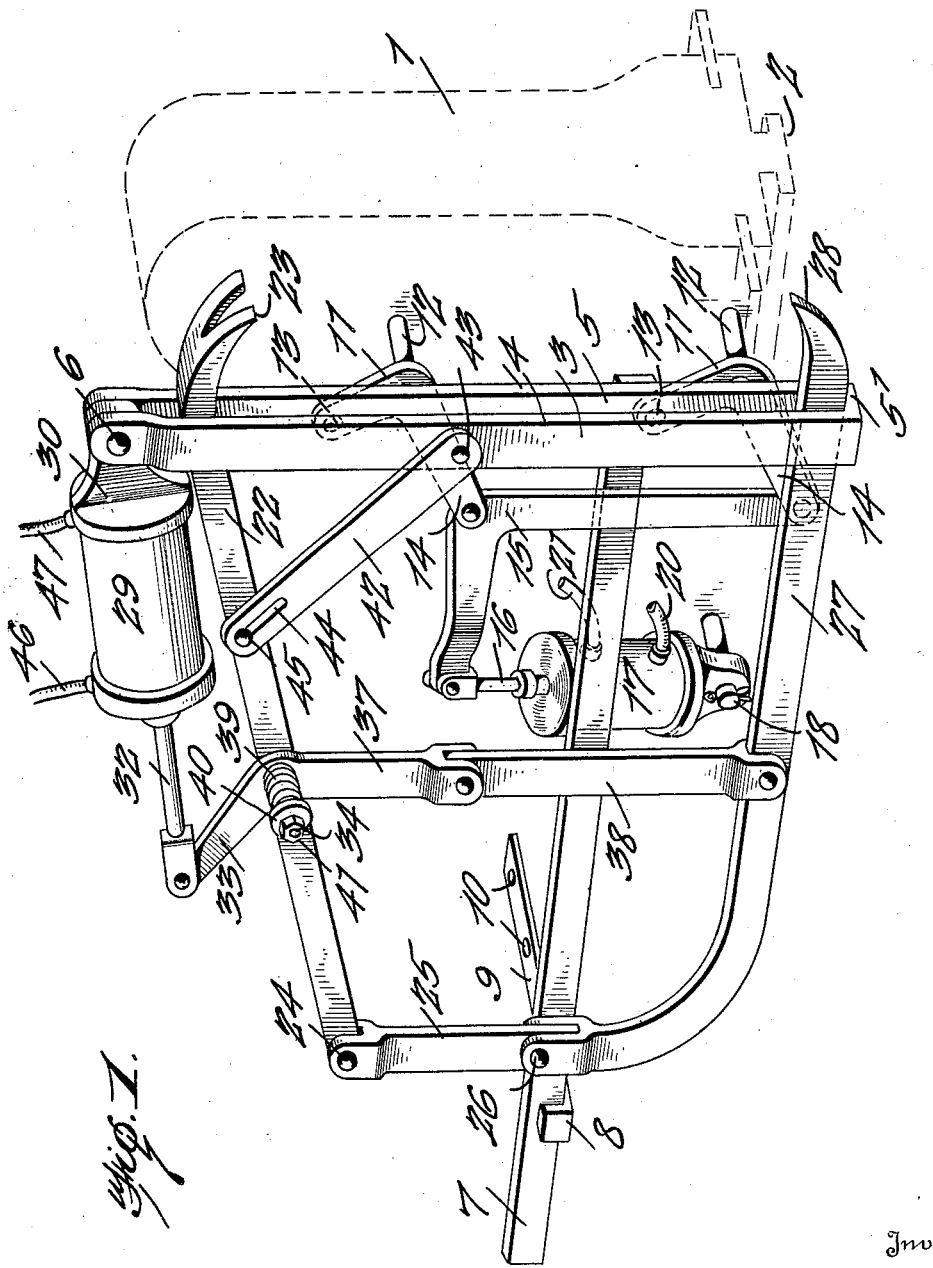
Inventor
F. E. MARTIN,
By
Attorney

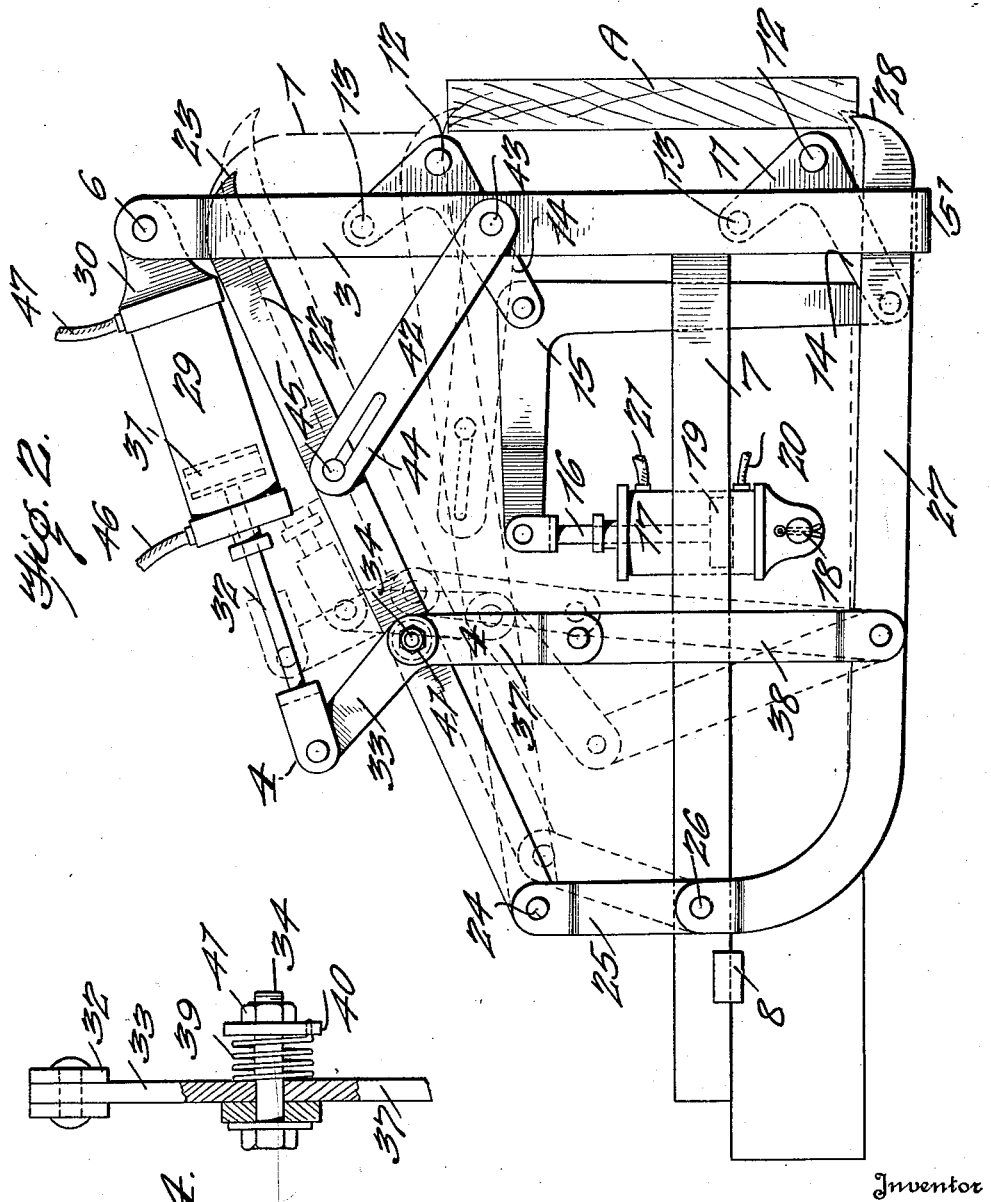

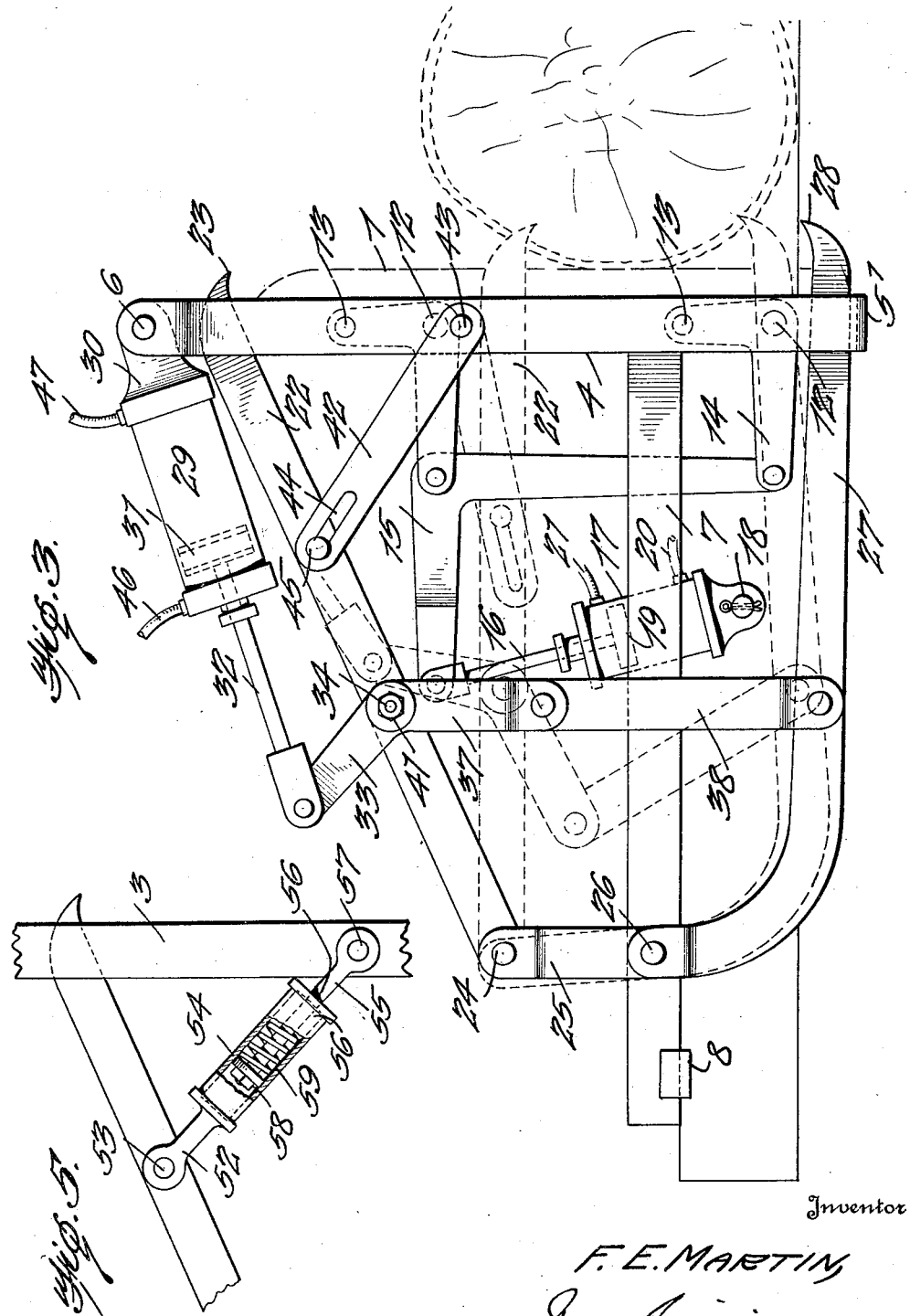

Patented Jan. 12, 1932

1,840,846

UNITED STATES PATENT OFFICE

FREDERICK E. MARTIN, OF BERKELEY, CALIFORNIA, ASSIGNOR TO MARTIN AIR DOG COMPANY, OF SAN FRANCISCO, CALIFORNIA, A CORPORATION OF CALIFORNIA

DOGGING DEVICE FOR SAWMILL CARRIAGES

Application filed October 1, 1926. Serial No. 138,914.

This invention is directed to an improvement in dogging devices for saw mill carriages, wherein provision is made for adjusting the distance of the dogs beyond the face of the knee, and for operating the dogs in any such adjusted position.

One object of the invention is the provision of a mounting for the dogs which is bodily movable toward and from the face of the knee to cause the dogs, when operated, to project the minimum or maximum distance beyond the knee, to permit effective cooperation of such dogs with a cant or with a log as may be desired.

A further object of the invention is the provision of dogs and a motor arrangement for operating the dogs, with connections between the dogs and connections between the dogs and frame or mounting, with all such parts carried solely by the mounting to insure an effective and identical operation of the dogs in any adjusted position of the mounting.

A further object of the invention is the provision of connections between the dogs and mounting to permit the upper dog, in the initial operation of the power instrumentality, to have an independent movement tending to project the operative end of the dog to a predetermined position beyond the face of the knee, the connections between this dog and the power instrumentality and mounting, serving thereafter to cause the operative end of the dog to move vertically in a line substantially parallel to the face of the knee.

A still further object of the invention is to provide a single power instrumentality, which through the medium of the connections between the dogs and dog mounting, will act initially on one dog until effective operation is had, and thereafter act on the companion dog to secure effective operation of the latter.

The invention is illustrated in the accompanying drawings, in which:

Fig. 1 is a perspective view of the dog and mounting therefor.

Fig. 2 is a side elevation of the same, the parts being shown in the various positions occupied in dotted outlines.

Fig. 3 is a similar view, the parts being shown in dotted lines in the positions occupied when there is no cant or log on the knee to be engaged.

Fig. 4 is a detailed section of the frictional device between the actuator and dog.

Fig. 5 is a detailed view of the modified form.

The dogging devices of the present improvement are arranged to cooperate with a knee 1, mounted on and having the usual movement relative to a head block 2, such parts being conventionally shown in the drawings.

The present invention may be said to include distinct, yet cooperating dog governing means; one, a dog positioning means, in the use of which the position of the dogs beyond the face of the knee may be adjusted to arrange the dogs for minimum projection, as for cooperation with a cant or board, or for maximum projection for cooperation with a log; and the other, a dog operating means, whereby the dogs, set for the predetermined projection, may be directly operated to engage the cant or log, to grip and hold the same against the knee during the sawing operation.

These respective dog governing means must be capable of independent control, in that the operation of one must not affect the other, and the dog operating means must so control the movement of the dogs that at no time during such movement will the dogs operate in a plane beyond that determined by the dog positioning means, as otherwise the dogs may encroach upon the saw line.

The dog positioning means comprises a frame made up of a dog guide 3, including spaced parallel bars 4, extending vertically of the knee and defining a space 5 between them to slidably receive the dogs, the bars being connected at their lower ends by a cross piece 5'. The frame includes a longitudinally extending bar 7, connected at its forward end to one of the bars 4 and slidably supported at its rear end in a guide 8 formed at one end of a bracket 9, which is rigidly secured to the knee as at 10. The positioning means include upper and lower angle levers 11 pivoted at their junctures to the knee on pivots 12, the short arm 13 of the angle levers being pivotally connected to one of the bars 4 of the dog guide, the longer arms 14 of such levers being connected to an operating lever 15 of angle form, one terminal of which is connected to the piston rod 16 of a pressure cylinder 17, pivotally supported at 18 on the knee, the piston 19 of such rod 16 being operative within the cylinder 17 by fluid pressure admitted through pipes 20 and 21, and designed to be controlled at will.

The pivotal supports for the angle levers 11 and pressure cylinder 17 extend laterally from the sides of the knee 1, and obviously with the piston 19 at its lowest limit, as under pressure admitted through pipe 21, the positioning frame will be at its inner limit with respect to the face of the knee, while with the piston in the upper position and the pressure admitted through pipe 20, the angle levers 11 will be rocked on their pivots to move the positioning frame in a direction toward the face of the knee, that is, to maximum position.

An upper dog 22 comprising an elongated bar terminating in dog points 23 is slidably mounted in the guide space 5 between the bars 4, the rear end of the upper dog bar being pivotally connected at 24 to the upper end of a link 25, the lower end of which is supported upon a pivot 26 projecting from the longitudinal bar 7 adjacent the guide 8. The lower dog 27, also in the form of a bar with a terminal dog point 28 at its forward end, is turned upwardly at its rear end and mounted on the pivot 26.

A dog operating cylinder 29 is pivotally supported at the upper ends of the bars 4 of the dog guide, preferably through the medium of a pin 6 passing through a web 30 extending from one end of the cylinder. The piston 31 in the cylinder is connected through the medium of piston rod 32 to the upper arm of an actuator 33 in the form of an angle lever pivotally supported at the juncture of its arms on a pivot pin 34 projecting from the upper dog in advance of the connection thereto of the link 25.

The lower arm 37 of the actuator depends below the upper dog and is pivotally connected to the upper end of a link 38, the lower end of which is pivotally connected to the lower dog 27. This actuator and link connection between the dogs forms in effect a toggle lever connection, which when broken serves to cause the dogs to approach each other.

It is important in the initial movement of the dog operating means that the actuator move with the upper dog as a unit without relative pivotal movement, and to secure this result, there is provided an adjustable tensioning means whereby the actuator and upper dog may be temporarily fixed against relative movement. This tensioning means is provided by elongating the pivot pin 34 and arranging thereon beyond the actuator a coil spring 39 bearing against the actuator by means of a washer 40 and adjustable in its pressure upon the parts by means of a nut 41, threaded upon the free end of the pivot pin 34.

To assist in determining the proper relative movement of the upper dogs, there is provided what is termed a limiting link 42 between such upper dog and the guide 3, such link being pivotally connected at its forward end at 43 to one of the bars 4 of the dog guide, and, in the normal relation of the parts extending rearwardly and upwardly toward the upper dog, being formed with a slot 44 to slidably embrace a pin 45, projecting from such upper dog.

With the parts in normal position, as indicated in full lines in Fig. 2, it will be seen that the upper dog is in a position to arrange the dog points 23 thereof inwardly of the face of the knee, while the lower dog is below the plane of the head block. This is usual in this type of device to avoid the dog being struck by the log when thrown against the knees.

Assuming that it is desired to utilize the dogs to engage a cant or board, indicated at A, under which circumstances, as previously stated, the projection of the dogs beyond the knee when in operative position will be at their minimum. In this relation of the parts, the piston 19 of the pressure cylinder 17 will be at the lowest point of the cylinder, as for example, under pressure admitted through pipe 21, so positioning the lever 15 as to hold the angle levers with their short arms at the limit of rearward movement, thus through the connection of the dogs with the longitudinal bar 7, holding all parts in the retracted position.

In operating the dogs, fluid pressure is admitted behind the piston 31 of cylinder 29, as through pipe connection 46, and the upper end of the actuator is drawn toward the face of the knee. As the frictional resistance to the independent pivotal movement of the actuator and upper dog is to be sufficient to prevent such pivotal movement in the absence of resistance to the dog movement, it is apparent that in this movement of the actuator, the upper dog and actuator move as a unit, bodily advancing the dog to position the points 23 thereof in advance of the face of the knee. In this advance of the upper dog, there is a relative movement between the rear end of the dog and the link 25, on the pivot 24, as the latter swings on its pivotal connection 26, this pivot 24 thereby becoming a floating pivot. In the advance of the upper dog, the pin 45 thereof rides in the slot 44 of the limiting link 42, and the advancing movement of the upper dog is interrupted by the contact of the pin 45 with the forward wall of the slot 44. At this point, the upper dog has been advanced to position the points thereof at the desired projection beyond the face of the knee, that is, the minimum projection in the operation being described, as shown by the dotted lines in Fig. 2.

When the forward movement of the upper dog is thus interrupted, the continued operation of the actuator under the movement of the piston, which actuator in the dog advancing movement described has been operating about the pivotal connection of the link 38 with the lower dog, without appreciable effect on the latter to overcome the frictional resistance between the actuator and upper dog and break the toggle joint between the lower arm 37 of the actuator and the upper end of the link 38, tending obviously to move the dogs relatively toward each other. As the lower dog will be held by gravity in its lower position until such gravital influence is overcome, the relative movement referred to will be confined substantially to the upper dog, and the latter will of course move downwardly to cause the points 23 to engage the upper edge of the board A. It is important that this downward movement of the dog point be in substantially a straight line, that is, a line parallel with the face of the knee, as otherwise the dog might engage boards of different heights on the knee, or of different thicknesses from the knee at different points and be thereby liable to improperly hold the board or project the dog too close to the saw line. Through the instrumentalities described, this downward movement of the upper dog is maintained in substantially a straight line, for as the free end of the dog moves downwardly, the tendency of such free end to move in a curve path outwardly from the knee, incident to the mounting on the link 25, is counteracted and directly compensated for by the movement of the limiting link 42 about its pivot 43, which in the downward movement of the upper dog tends to move said dog rearwardly. This rearward tendency of the upper dog is permitted by the floating pivot 24, and with the parts properly proportioned, the dog points 23 of the upper dog will move in a line which is practically in parallelism with the face of the knee, until the edge of the board A is engaged, as shown in dotted lines in Fig. 2. When the dog points of the upper dog engage the upper edge of the board, and further downward movement of the upper dog is thus interrupted, the continued movement of the actuator exerts an endwise pull upon the link 38, with the effect to draw the lower dog upwardly and cause its point 28 to engage the lower edge of the board A, as indicated by the dotted lines in Fig. 2.

In releasing the dogs, the piston 31 of cylinder 29 is moved in the opposite direction through pressure admitted to the cylinder through pipe connection 47. The initial movement of the actuator tends to restore the toggle alignment with the link 38, thus forcing the lower dog, assisted by the weight of the latter, from engaging position with the board A. Substantially at the same time the upper dog is rocked upwardly, due to the toggle movement, and the dog points 23 are disengaged from the board A. Further downward movement of the lower dog is resisted through contact of such dog with the cross piece 5' at the lower ends of the bars 4 of the dog guide, and the continued movement of the actuator moves the upper dog rearwardly, permitted by the pin 45 moving rearwardly in a slot 44, and the rearward swinging of the link 25 permitted through the floating pivot 24. This movement of the actuator toward the alignment of the toggle sections moves the upper dog inwardly, until finally the upper dog is at its inner upward limit, with the points in line with or inwardly of the face of the knee.

To secure the maximum projection of the dogs, that is, when it is desired to cause the dogs to cooperate with logs or quarters, pressure is admitted to the cylinder 17 through pipe 20, raising the piston 19 therein and bodily moving the operating lever 15 to swing the angle levers 11 on their pivots 12, thereby moving the dog guide and longitudinal bar 7 forwardly relative to the face of the knee, as shown in Fig. 3. As all parts of the mechanism, except the positioning means, are supported on the frame structure including the dog guide and longitudinal bar 7, it follows that the dogs and their operating parts will be simultaneously moved with the frame, so that in the subsequent operation of the dog, which is identical with that previously described, such dog will operate at points farther in advance of the knee than at their minimum positions, thereby facilitating the engagement and holding of quarters or round logs for the sawing operation, as shown in dotted lines in Fig. 3.

In Fig. 5 a different form of link connection between the upper dog member and the dog mounting is shown. In this instance, a spring arrangement is employed in lieu of the slot 44 and pin 45. 52 indicates a bracket pivoted at 53 to the upper dog. The bracket supports a cylinder 54, provided at its lower end with a perforated cap 56. Extending through the cap 56 is a rod 55 pivoted at its lower end 57 to the vertical bar of the mounting 3, and provided at its other end with a nut and washer 58. Between the washer 58 and the cap 56 is interposed the spring 59, the tension of which normally forces the washer and the cap apart. When using this form of link connection the spring is under tension so that when pressure is introduced in cylinder 29 to operate the dogs, the spring acts to bodily move the upper dog forwardly in its first movement beyond the face of the knee, and the end of the rod 55 abutting against the bracket 52 then forms an abutment between the parts in substantially the same way the end wall of the slot 44 acts in connection with the stud 45. The only difference in action between the two constructions is the resultant path of movement of the upper dog point when the parts are returned to normal position. That is to say, as previously described, when pressure in cylinder 29 is reversed to return the dogs, stud 45 moves in slot 44, and withdraws the upper dog, and then moves it upwardly in a path inside the face of the knee, whereas with the spring arrangement the connections between the pivotal points 53 and 57 are maintained until the dog reaches its uppermost position, then the greater direct pressure on the piston 31, overcomes the tension of the spring 59 and the dog is pulled back to normal position. In this operation the rod 55 is separated from the bracket 52, and the spring is compressed for the next operation. As the spring maintains the relationship between the dog and mounting until overcome by the greater pressure on the lever 33, the point 23 of the upper dog returns to normal position in substantially the same path in front of the knee as it travelled when moving to position to engage a board.

What is claimed as new is:

1. In a dogging device for saw mill carriages, a knee, a dog mounting movable relative to the knee, dogs, a power unit therefor to operate the dogs in both directions toward and from each other, and connections between the dogs and mounting, said dogs, power unit, and connections, being pivotally connected to be carried solely by and movable with the mounting to insure identical operation of the dogs in any position of the mounting.

2. In a dogging device for saw mill carriages, a knee, a mounting movable with respect to the knee, means for controlling the movement of the mounting, an upper dog carried by the mounting, a lower dog carried by the mounting, a power unit carried by the mounting, a connection between said power unit and the upper and lower dogs, and means intermediate the upper dog and mounting to permit said dog in the operation of the power unit to initially move forward relative to the face of the knee and then constrain the movement of the dog into one downwardly in a line substantially parallel with the face of the knee.

3. In a dogging device for saw mill carriages, an upper dog, a lower dog, a power unit, means for supporting the upper dog to permit the latter in the actuation of the power unit to advance bodily relative to the knee and then constrain the movement of the dog into one downwardly in a line substantially parallel to the face of the knee, and a mounting movable relative to the knee and supporting all said parts to maintain their unitary relation in all positions of the mounting.

4. In a dogging device for saw mill carriages, a knee, a mounting movable relative to the knee, an upper dog supported by the mounting, a power unit supported by the mounting, an actuator between the power unit and upper dog, and a limiting means carried by the mounting and having a limited play connection with the upper dog, whereby in the operation of the power unit the actuator serves to initially permit the upper dog to move forwardly to the limit of the play permitted with the limiting means and thereafter constrain the movement of the dog into one downwardly with the connection between the upper dog and limiting means and between the upper dog and mounting opposing each other in the tendency of the dog to move in an arc, whereby the dog is compelled to travel in a substantially straight line parallel to the face of the knee.

5. In a dogging device for saw mill carriages, a knee, a dog mounting movable relative to the knee a power unit on said mounting, an upper dog having a floating pivot connection at one end with said mounting, an actuator between the power unit and upper dog for initially moving the dog for projection beyond the face of the knee, a limiting means between the mounting and upper dog and having a limited play connection with the upper dog, said limiting means serving to limit the operation of the dog under the actuator, and means for resisting relative movement transverse to the dog projecting movement between the actuator and upper dog during that movement of the upper dog necessary to take up the play between said dog and limiting means.

6. In a dogging device for saw mill carriages, a knee, a dog mounting movable relative to the knee a power unit on said mounting, an upper dog having a floating pivot connection at one end with said mounting, an actuator between the power unit and upper dog initially moving the dog for projection beyond the face of the knee, a limiting means between the mounting and upper dog and having a limited play connection with the upper dog, said limiting means serving to limit the operation of the dog under the actuator, and friction means for resisting relative movement transverse to the dog projecting movement between the actuator and upper dog during that movement of the upper dog necessary to take up the play between said dog and limiting means.

7. In a dogging device for saw mill carriages, a knee, a dog mounting movable relative to the knee a power unit on said mounting, an upper dog having a floating pivot connection at one end with said mounting, an actuator between the power unit and upper dog for initially moving the dog for projection beyond the face of the knee, a limiting means between the mounting and upper dog and having a limited play connection with the upper dog, said limiting means serving to limit the operation of the dog under the actuator, and means for resisting relative movement transverse to the dog projecting movement between the actuator and upper dog during that movement of the upper dog necessary to take up the play between said dog and limiting means, said means yielding following such upper dog movement to thereafter permit a relative play between the actuator and upper dog, and means to convert such relative play between the actuator and upper dog into a downward pull on the upper dog.

8. In a dogging device for saw mill carriages, a knee, a dog mounting movable relative to the knee a power unit on said mounting, an upper dog having a floating pivot connection at one end with said mounting, an actuator between the power unit and upper dog for initially moving the dog for projection beyond the face of the knee, a limiting means between the mounting and upper dog and having a limited play connection with the upper dog, said limiting means serving to limit the operation of the dog under the actuator, and adjustable friction means for resisting relative movement transverse to the dog projecting movement between the actuator and upper dog during that movement of the upper dog necessary to take up the play between said dog and limiting means.

9. In a dogging device for saw mill carriages, a knee, a dog mounting movable relative to the knee, an upper dog carried by the mounting, a lower dog carried by the mounting, a power unit carried by the mounting, an actuator mounted on the upper dog and connected to the lower dog, said actuator being operated by the power unit, means whereby the actuator and upper dog move as a substantially rigid element in the initial operation of the power unit to thereby bodily move the upper dog forwardly, and means for interrupting the bodily forward movement of the upper dog and thereby convert the connection between the actuator and upper dog to a pivotal one to thereby cause the following movement of the actuator through its connection with the lower dog to insure a relative movement of the dogs toward each other.

10. In a dogging device for saw mill carriages, a knee, a dog mounting movable relative to the knee, an upper dog carried by the mounting, a lower dog carried by the mounting, a power unit carried by the mounting, an actuator mounted on the upper dog and connected to the lower dog, said actuator being operated by the power unit, frictional means for holding the actuator and upper dog as a substantially rigid element in the initial operation of the power unit, and a limiting means pivotally connected to the mounting and connected to the upper dog to break such frictional means following a predetermined movement of the upper dog and actuator, whereby to permit the actuator to have pivotal movement relative to the upper dog and act through the connection with the lower dog to cause a relative movement of the dogs toward each other.

In testimony whereof I affix my signature.

FREDERICK E. MARTIN.